United States Patent
Watanabe et al.

(10) Patent No.: US 11,362,917 B2
(45) Date of Patent: Jun. 14, 2022

(54) SLAVE, WORK MACHINE, AND LOG INFORMATION STORAGE METHOD

(71) Applicant: FUJI CORPORATION, Chiryu (JP)

(72) Inventors: Kenji Watanabe, Chiryu (JP); Takeshi Sato, Nagoya (JP); Nobuo Nagasaka, Okazaki (JP)

(73) Assignee: FUJI CORPORATION, Chiryu (JP)

( * ) Notice: Subject to any disclaimer, the term of this patent is extended or adjusted under 35 U.S.C. 154(b) by 0 days.

(21) Appl. No.: 16/981,013

(22) PCT Filed: Mar. 26, 2018

(86) PCT No.: PCT/JP2018/012086
§ 371 (c)(1),
(2) Date: Sep. 15, 2020

(87) PCT Pub. No.: WO2019/186635
PCT Pub. Date: Oct. 3, 2019

(65) Prior Publication Data
US 2021/0111977 A1    Apr. 15, 2021

(51) Int. Cl.
*H04L 43/0811*    (2022.01)
*G05B 23/02*    (2006.01)
(Continued)

(52) U.S. Cl.
CPC ...... *H04L 43/0811* (2013.01); *G05B 23/0224* (2013.01); *H04L 41/069* (2013.01);
(Continued)

(58) Field of Classification Search
CPC .......... G11C 2029/0411; G11C 29/765; G11C 29/82; G11C 13/0002; G11C 29/44;
(Continued)

(56) References Cited

U.S. PATENT DOCUMENTS 5,384,765 A  *  1/1995  Sakagami ................ G05B 9/02
                                                    340/458
7,802,145 B1     9/2010  Bainbridge et al.
(Continued)

FOREIGN PATENT DOCUMENTS

JP         2011-197952 A     10/2011

OTHER PUBLICATIONS

International Search Report dated May 22, 2018 in PCT/JP2018/012086 filed on Mar. 26, 2018, 1 page.

*Primary Examiner* — Tonia L Dollinger
*Assistant Examiner* — Linh T. Nguyen
(74) *Attorney, Agent, or Firm* — Oblon, McClelland, Maier & Neustadt, L.L.P.

(57) ABSTRACT

There are provided a slave, a work machine, and a method for storing log information, which are capable of appropriately store the log information when a communication abnormality occurs such that communication cannot be kept between a master and the slave in an industrial network. The control section performs first storage processing storing the log information into a volatile storage section when a communication abnormality occurs such that communication with the master cannot be kept, communication abnormality determination processing for determining whether the communication abnormality has occurred, and second storage processing storing the log information into a non-volatile storage section by acquiring the log information from the volatile storage section, in response to a determination made in that the communication abnormality has occurred as a result of the communication abnormality determination processing.

10 Claims, 5 Drawing Sheets

(51) Int. Cl.
*H04L 41/0631* (2022.01)
*H04L 41/069* (2022.01)
*H04L 67/12* (2022.01)

(52) U.S. Cl.
CPC .......... *H04L 41/0631* (2013.01); *H04L 67/12* (2013.01); *G05B 2223/02* (2018.08)

(58) Field of Classification Search
CPC ............ G05B 23/0224; G05B 2223/02; G05B 2219/31449; G05B 19/4185; H04L 41/0631; H04L 41/069; H04L 67/12; H04L 43/0811; H04L 41/06; H04L 43/04; H04L 43/0847; G06F 11/008; G06F 11/2082
See application file for complete search history.

(56) References Cited

U.S. PATENT DOCUMENTS

| | | | |
|---|---|---|---|
| 2002/0044783 A1* | 4/2002 | Eck | G03G 15/5079 399/10 |
| 2002/0166225 A1* | 11/2002 | Kodama | H05K 13/08 29/592.1 |
| 2008/0208533 A1* | 8/2008 | Yokogawa | G06F 11/0739 702/183 |
| 2008/0282113 A1* | 11/2008 | Yuuki | G06F 11/0787 714/45 |
| 2011/0231712 A1 | 9/2011 | Hirata | |
| 2014/0047056 A1* | 2/2014 | Tahara | H04L 41/046 709/208 |
| 2016/0335145 A1* | 11/2016 | Toba | G06F 11/07 |
| 2017/0139765 A1* | 5/2017 | Ko | G06F 11/0727 |
| 2017/0250883 A1* | 8/2017 | Sawada | H04L 41/06 |
| 2017/0346595 A1* | 10/2017 | Kanai | H04J 3/08 |
| 2018/0048714 A1* | 2/2018 | Kanai | G06B 19/418 |
| 2018/0300061 A1* | 10/2018 | Hsu | G06F 3/0679 |
| 2019/0095293 A1* | 3/2019 | Zhang | G06F 11/20 |
| 2019/0102114 A1* | 4/2019 | Sela | G06F 3/0679 |
| 2020/0316961 A1* | 10/2020 | Ueno | B41J 3/28 |
| 2020/0344114 A1* | 10/2020 | Kanai | H04L 41/0654 |

* cited by examiner

SLAVE, WORK MACHINE, AND LOG INFORMATION STORAGE METHOD

TECHNICAL FIELD

The present disclosure relates to a slave for processing control data transmitted from a master in an industrial network, a work machine including the slave, and a method for storing log information.

BACKGROUND ART

Conventionally, an information processing device is known which stores an address of a memory accessed by a CPU as an access log (for example, Patent Literature 1). In the information processing device disclosed in Patent Literature 1, in a case where a system controller detects that an error occurs in processing of the CPU, the access log stored in an internal RAM is stored in a non-volatile RAM.

PATENT LITERATURE

Patent Literature 1: JP-A-2011-197952

BRIEF SUMMARY

Technical Problem

Incidentally, a network communication technology such as the Internet is used in a factory automation (FA) field, and in some cases, the technology is called an industrial network which is aimed for use in the FA field. For example, the industrial network configuration is made from a network in which a master and a slave controlled by the master are connected to each other. The slave provided inside of a control target device is controlled using control data transmitted from the master, and thus an operation of the device can be controlled.

In this type of the industrial network, in a case where an abnormality occurs in the control target device, a cause of the abnormality can be specified by causing the master to acquire log information of the slave and analyzing the acquired log information. However, when a communication abnormality occurs such that communication cannot be kept between the master and the slave, the master cannot acquire the log information from the slave. Further, in a case where the log information is stored in a volatile storage section on the slave side, if power is turned off due to the occurrence of the communication abnormality, then the log information is likely to be erased. As a result, it is difficult to specify the cause of the communication abnormality.

The present disclosure is made in view of the above-described problem, and an object thereof is to provide a slave, a work machine, and a method for storing log information, which are capable of appropriately store the log information in a case where a communication abnormality occurs such that communication cannot be kept between a master and the slave in an industrial network.

Solution to Problem

In order to solve the above problems, the present disclosure provides a slave including a communication interface connected to a master in an industrial network, a control section configured to perform processing based on control data transmitted from the master via the communication interface, a volatile storage section connected to the control section, and a non-volatile storage section connected to the control section, in which the control section performs first storage processing storing log information into the volatile storage section when a communication abnormality occurs such that communication with the master cannot be kept, communication abnormality determination processing for determining whether the communication abnormality has occurred, and second storage processing storing the log information into the non-volatile storage section by acquiring the log information from the volatile storage section, in response to a determination made in that the communication abnormality has occurred as a result of the communication abnormality determination processing. In addition, contents of the present disclosure can be implemented not only as the slave, but also as a work machine including the slave and a method for storing log information.

Advantageous Effects

According to the slave of the present disclosure, the slave stores the long information into the volatile storage section during a normal operation. The slave causes the non-volatile storage section to store the log information stored in the volatile storage section, in response to occurrence of the communication abnormality. In this manner, even when power supply to the slave is stopped, the log information can be continuously stored in the non-volatile storage section.

DESCRIPTION OF EMBODIMENTS

Figure 1:
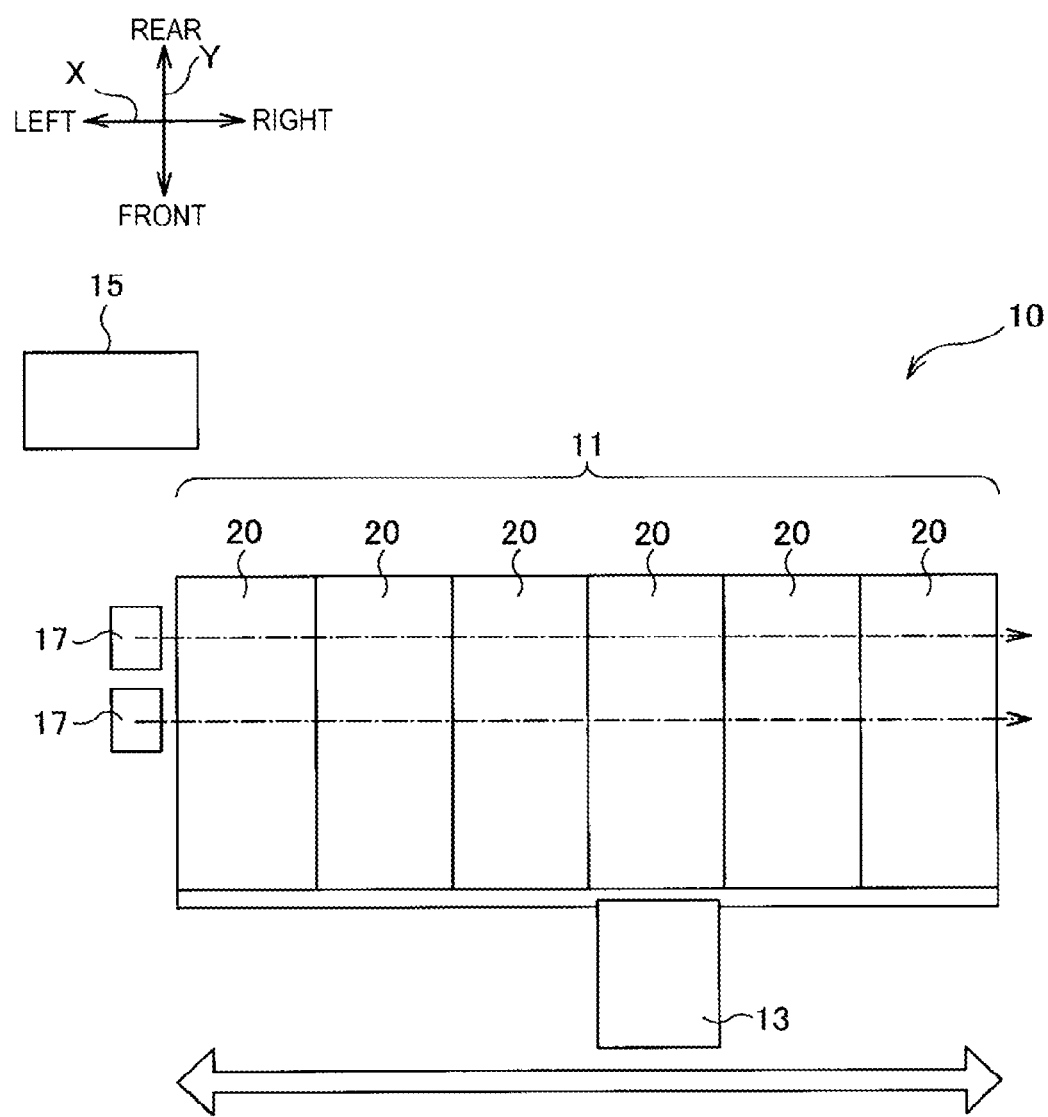
FIG. 1 is a plan view illustrating a schematic configuration of a component-mounting system of the present embodiment.

Hereinafter, an embodiment of the present disclosure will be described with reference to the drawings. FIG. 1 is a plan view illustrating a schematic configuration of component-mounting system 10 of the present embodiment.

Figure 2:
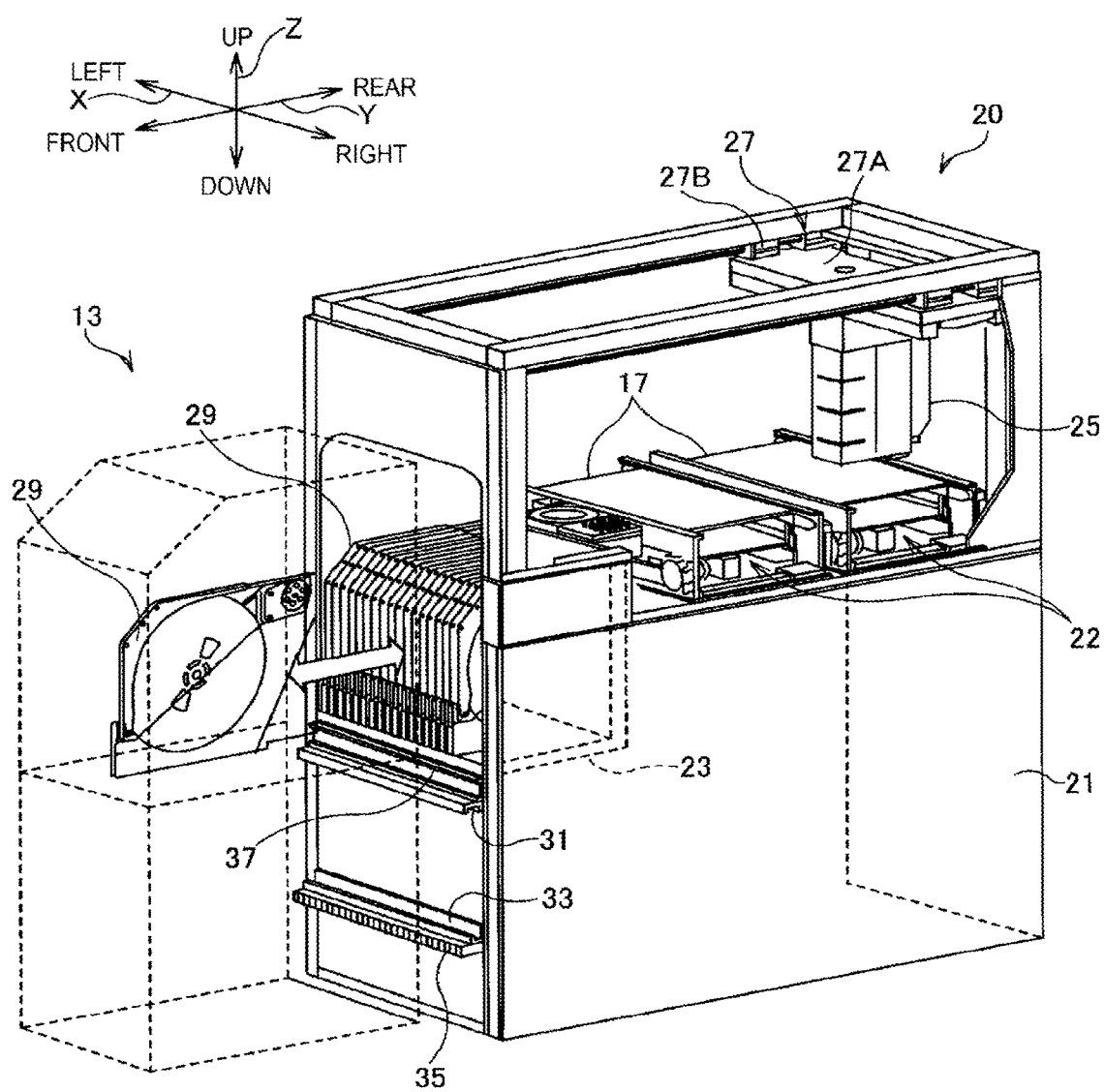
FIG. 2 is a perspective view illustrating a schematic configuration of a component mounter and a loader.

FIG. 2 is a perspective view illustrating a schematic configuration of component mounter 20 and loader 13. In the following description, a rightward-leftward direction in FIG. 1 will be referred to as an X-direction, an upward-downward direction (forward-rearward direction) will be referred to as a Y-direction, and a direction perpendicular to the X-direction and the Y-direction will be referred to as a Z-direction.

As illustrated in FIG. 1, component-mounting system 10 includes production line 11, loader 13, and management computer 15. Production line 11 has multiple component mounters 20 aligned in the X-direction, and mounts an electronic component on board 17. For example, board 17 is conveyed from left-side component mounter 20 to right-side component mounter 20 illustrated in FIG. 1, and the electronic component is mounted on board 17 while the electronic component is conveyed.

As illustrated in FIG. 2, component mounter 20 includes device main body section 21, board conveyance device 22, feeder base 23, head section 25, and head moving mechanism 27. Board conveyance device 22 is disposed in an upper section of device main body section 21, and conveys board 17 in the X-direction. Feeder base 23 is disposed on a front surface of device main body section 21, and is an L-shaped base in a side view. Feeder base 23 includes multiple slots (not illustrated) aligned in the X-direction. Feeder 29 for supplying the electronic component is mounted on each slot of feeder base 23. For example, feeder 29 is a tape feeder for supplying the electronic component from a tape which accommodates the electronic component at a predetermined pitch.

Head section 25 includes a suction nozzle (not illustrated) for pick up the electronic component supplied from feeder 29, and mounts the electronic component picked up by the suction nozzle on board 17. Head moving mechanism 27 moves head section 25 to any desired position in the X-direction and the Y-direction, on device main body section 21. Specifically, head moving mechanism 27 includes X-axis slide mechanism 27A for moving head section 25 in the X-direction, and Y-axis slide mechanism 27B for moving head section 25 in the Y-direction. X-axis slide mechanism 27A is attached to Y-axis slide mechanism 27B. Y-axis slide mechanism 27B has a linear motor (not illustrated) as a drive source. X-axis slide mechanism 27A moves to any desired position in the Y-direction, based on the drive of the linear motor of Y-axis slide mechanism 27B. In addition, X-axis slide mechanism 27A has a linear motor (not illustrated) as a drive source. Head section 25 is attached to X-axis slide mechanism 27A, and moves to any desired position in the X-direction, based on the drive of the linear motor of X-axis slide mechanism 27A. Accordingly, head section 25 moves to any desired position on device main body section 21 in accordance with the driving of X-axis slide mechanism 27A and Y-axis slide mechanism 27B. In addition, X-axis slide mechanism 27A includes first slave 51 (refer to FIG. 3) connected to an industrial network (to be described later).

In addition, head section 25 is attached to X-axis slide mechanism 27A via a connector, is attachable and detachable by one touch, and head section 25 can be changed to different types such as a dispenser head, for example. Therefore, head section 25 of the present embodiment is attachable to and detachable from device main body section 21. In addition, mark camera 66 (refer to FIG. 3) for imaging board 17 is fixed to head section 25 in a state of facing downward. In accordance with the movement of head section 25, mark camera 66 can image any desired position of board 17 from above. Image data GD acquired by mark camera 66 is subjected to image processing in main body control device 41 of the device main body section 21 (refer to FIG. 3). Through the image processing, main body control device 41 acquires information relating to board 17 and an error of a mounting position.

Head section 25 includes second slave 61 (refer to FIG. 3) connected to the industrial network. Elements such as various sensors are connected to second slave 61 to process signals input to and output from the elements. In addition, head section 25 has part camera 67 for imaging the electronic component picked up and held by the suction nozzle. Image data GD acquired by part camera 67 is subjected to image processing in main body control device 41 (refer to FIG. 3) of device main body section 21. Through the image processing, main body control device 41 acquires an error of a holding position of the electronic component in the suction nozzle.

In addition, as illustrated in FIG. 2, a front surface of component mounter 20 has upper guide rail 31, lower guide rail 33, rack gear 35, and non-contact power supply coil 37. Upper guide rail 31 is a rail having a U-shaped a cross section and extending in the X-direction, and an opening thereof faces downward. Lower guide rail 33 is a rail having an L-shaped cross section and extending in the X-direction, a vertical surface thereof is attached to a front surface of component mounter 20, and a horizontal surface thereof extends forward. Rack gear 35 is a gear disposed in a lower section of lower guide rail 33 and extending in the X-direction, and in which multiple longitudinal grooves are engraved on a front surface of rack gear 35. Upper guide rail 31, lower guide rail 33, and rack gear 35 of component mounter 20 can be detachably coupled to upper guide rail 31, lower guide rail 33, and rack gear 35 of adjacent component mounter 20. Therefore, in component mounter 20, the number of component mounters 20 aligned in production line 11 can be increased or decreased. Non-contact power supply coil 37 is a coil disposed in an upper section of upper guide rail 31 and disposed along the X-direction, and supplies power to loader 13.

Loader 13 is a device for automatically replenish and recover feeder 29 to and from component mounter 20, and includes a clamping section (not illustrated) for clamping feeder 29. Loader 13, has an upper roller (not illustrated) to be inserted into upper guide rail 31, and a lower roller (not illustrated) to be inserted into lower guide rail 33. In addition, loader 13 has a motor serving as a drive source. A gear that meshes with rack gear 35 is attached to an output shaft of the motor. Loader 13 includes a power receiving coil that receives the power supplied from non-contact power supply coil 37 of component mounter 20. Loader 13 supplies the power received from non-contact power supply coil 37 to the motor. In this manner, since the gear is rotated by the motor, loader 13 can move in the X-direction (rightward-leftward direction). In addition, loader 13 rotates a roller inside upper guide rail 31 and lower guide rail 33, and can move in the X-direction while holding a position in the upward-downward direction and the forward-rearward direction.

Management computer 15 is a device for comprehensively managing component-mounting system 10. For example, component mounter 20 of production line 11 starts a mounting operation of the electronic component, based on the management of management computer 15. Component mounter 20 causes head section 25 to perform the mounting operation of the electronic component while conveying board 17. In addition, management computer 15 monitors the number of remaining electronic components of feeder 29. For example, for example, when management computer 15 determines that feeder 29 needs to be replenished, management computer 15 causes a screen to display an instruction that feeder 29 accommodating a component type to be replenished is set in loader 13. A user checks the screen, and sets feeder 29 in loader 13. When detecting that desired feeder 29 is set in loader 13, management computer 15 instructs loader 13 to start a replenishment operation. Loader 13 moves forward of component mounter 20 receiving the instruction, and feeder 29 set by the user is clamped by the clamping section to be mounted on a slot of feeder base 23. In this manner, new feeder 29 is replenished to component mounter 20. In addition, loader 13 uses the clamping section to clamp feeder 29 having no more component, and pulls out and recovers feeder 29 from feeder base 23. In this way, replenishment of new feeder 29 and recovery of feeder 29 having no more component can be automatically performed by loader 13.

Figure 3:
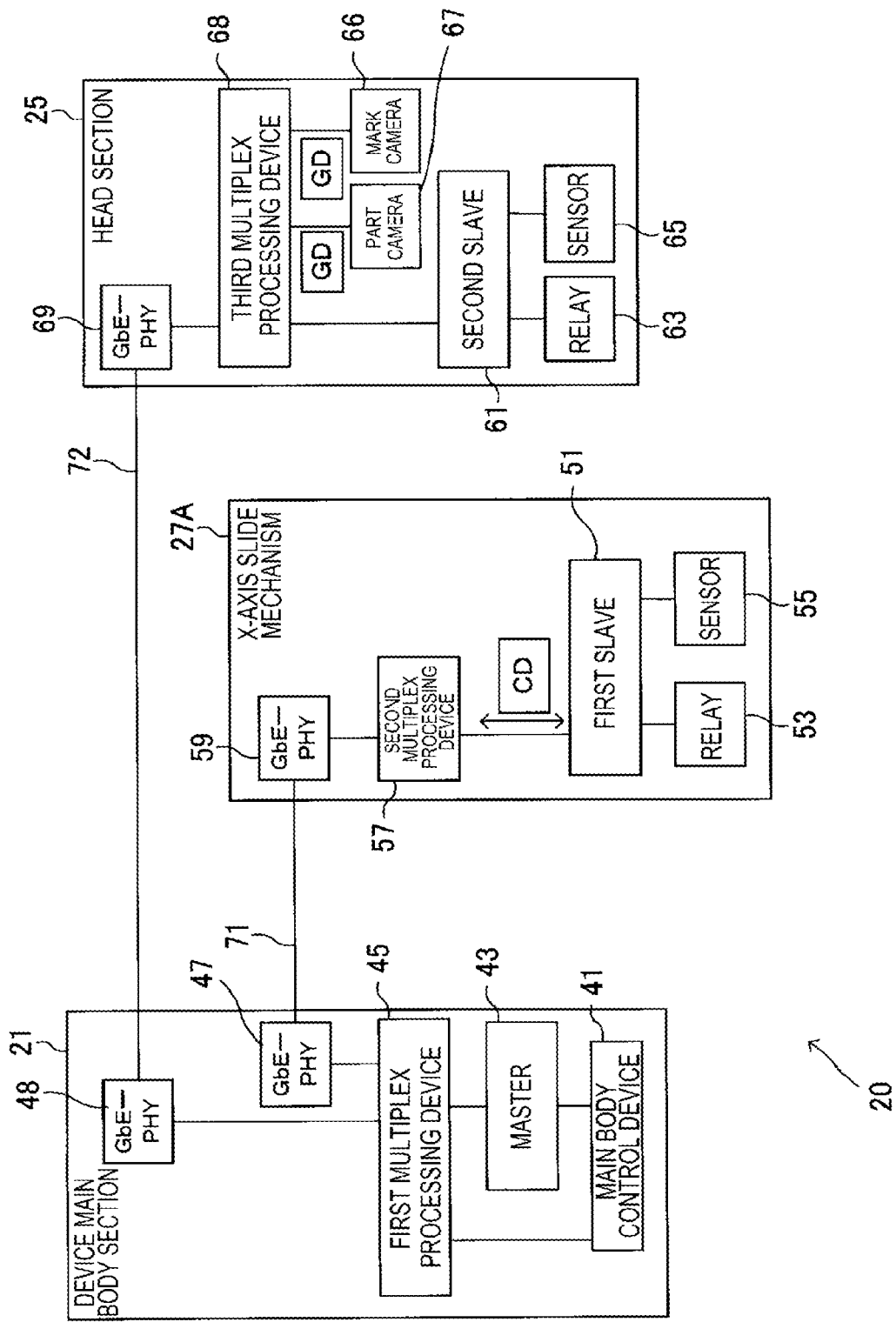
FIG. 3 is a block diagram of a multiplex communication system.

Next, a multiplex communication system included in component mounter 20 will be described. FIG. 3 is a block diagram illustrating a configuration of the multiplex communication system applied to component mounter 20. As illustrated in FIG. 3, in component mounter 20, the multiplex communication system transmits data between device main body section 21 fixedly disposed in a place for installing the device, and the movable section (X-axis slide mechanism 27A and head section 25) moving relative to device main body section 21. A configuration of the multiplex communication system illustrated in FIG. 3 is an example, and can be appropriately changed. For example, data of each device disposed in Y-axis slide mechanism 27B may be transmitted by the multiplex communication system.

Device main body section 21 includes main body control device 41, master 43, and first multiplex processing device 45. X-axis slide mechanism 27A has first slave 51 controlled by master 43 of device main body section 21. Head section 25 has second slave 61 controlled by master 43. Master 43 comprehensively controls transmission of control data CD for controlling first slave 51 and second slave 61 which are connected to the industrial network. For example, the Industrial network is EtherCAT (registered trademark). The industrial network of the present disclosure is not limited to the EtherCAT (registered trademark), and for example, other networks (communication standards) such as MECHATRO-LINK (registered trademark)-III and Profinet (registered trademark) can be adopted.

For example, main body control device 41 is a processing circuit mainly including a CPU, and control data CD collected by master 43 or image data GD received by first multiplex processing device 45 is input to main body control device 41 to determine a subsequent control content (type of electronic component to be mounted or mounting position). In addition, main body control device 41 causes master 43 to transmit control data CD corresponding to the determined control content. Master 43 transmits control data CD to first slave 51 and second slave 61 via the industrial network.

X-axis slide mechanism 27A has relay 53 and sensor 55 in addition to first slave 51. First slave 51 processes signals input to and output from each device such as relay 53 and sensor 55. For example, relay 53 is a limit switch for outputting a drive signal for driving a brake of a linear motor of X-axis slide mechanism 27A. For example, relay 53 drives the brake by outputting the drive signal to suppress overrun of X-axis slide mechanism 27A. For example, sensor 55 is a board height sensor for measuring a height of an upper surface of board 17, based on a reference height position set in device main body section 21. First slave 51 controls relay 53, based on control data CD received from master 43 of device main body section 21. In addition, first slave 51 processes an output signal of sensor 55, and transmits the output signal to master 43 as control data CD.

Head section 25 has relay 63 and sensor 65 in addition to second slave 61, part camera 67, and mark camera 66 which are described above. Second slave 61 processes signals input and output to and from each device such as relay 63 and sensor 65 which are disposed in head section 25. Second slave 61 controls relay 63, based on control data CD received from master 43 of device main body section 21. In addition, second slave 61 transmits an output signal of sensor 65 to master 43 as control data CD.

Next, multiplex communication for transmitting control data CD of the above-described industrial network or image data GD of part camera 67 will be described. Component mounter 20 of the present embodiment transmits data among device main body section 21, X-axis slide mechanism 27A, and head section 25 by using multiplex communication. As illustrated in FIG. 3, device main body section 21 has first multiplex processing device 45 and GbE-PHY 47 and 48 in addition to main body control device 41 described above. For example, GbE-PHY 47 and 48 are ICs that function as an interface between a logical layer and a physical layer. GbE-PHY 47 is connected to GbE-PHY 59 of X-axis slide mechanism 27A via LAN cable 71. Similarly, GbE-PHY 48 is connected to GbE-PHY 69 belonging to head section 25 via LAN cable 72. For example, LAN cables 71 and 72 are LAN cables conforming to communication standards of Gigabit Ethernet (registered trademark).

First multiplex processing device 45 of device main body section 21 transmits and receives multiplex data to and from second multiplex processing device 57 of X-axis slide mechanism 27A via LAN cable 71. In addition, first multiplex processing device 45 of device main body section 21 transmits and receives multiplex data to and from third multiplex processing device 68 of head section 25 via LAN cable 72. First to third multiplex processing devices 45, 57, and 68 multiplex and transmit control data CDs of the industrial network or image data GDs of part cameras 67 through time division multiplexing (TDM), for example. For example, first multiplex processing device 45 includes a logic circuit such as a field programmable gate array (FPGA).

Second multiplex processing device 57 of X-axis slide mechanism 27A is connected to GbE-PHY 59. Second multiplex processing device 57 is connected to first slave 51, and inputs and outputs control data CD to and from first slave 51. Second multiplex processing device 57 multiplexes control data CD and other data, and transmits the multiplex data to first multiplex processing device 45 (device main body section 21) via LAN cable 71.

In addition, third multiplex processing device 68 of head section 25 is connected to GbE-PHY 69. Third multiplex processing device 68 is connected to mark camera 66 and part camera 67. Mark camera 66 and part camera 67 output acquired image data GD to third multiplex processing device 68 in accordance with an image transmission standard such as GigE-vision (registered trademark), for example. For example, mark camera 66 and part camera 67 performs imaging in response to a trigger signal received via multiplex communication from main body control device 41 of device main body section 21, and outputs acquired image data GD to third multiplex processing device 68. Third multiplex processing device 68 is connected to second slave 61, and inputs and outputs control data CD to and from second slave 61. Third multiplex processing device 68 multiplexes various data such as image data GD and control data CD, and transmits the multiplex data to first multiplex processing device 45 through LAN cable 72.

First multiplex processing device 45 is connected to a GbE-PHY 47 and 48. In addition, first multiplex processing device 45 is connected to main body control device 41. First multiplex processing device 45 demultiplexes the multiplex data received from second multiplex processing device 57 or third multiplex processing device 68 via the multiplexing communication. For example, first multiplex processing device 45 demultiplexes the multiplex data received from third multiplex processing device 68, and separates image data GD of part camera 67. First multiplex processing device 45 outputs separated image data GD to main body control device 41 in a data format conforming to the standard of the GigE-vision (registered trademark).

In addition, first multiplex processing device 45 is connected to master 43. Master 43 constructs the industrial network that transmits and receives control data CD for controlling devices such as relay 53, and realizes wiring integration (reduction). More specifically, in the industrial network of the present embodiment, for example, control data CD transmitted from master 43 is transmitted to circulate through each of first multiplex processing device 45, second multiplex processing device 57, first slave 51, second multiplex processing device 57, first multiplex processing device 45, third multiplex processing device 68, second slave 61, third multiplex processing device 68, first multiplex processing device 45, and master 43. For example, first slave 51 performs reading or writing processing on control data CD received from master 43, and transmits control data CD to second slave 61 of head section 25. First slave 51 copies data from a data reading position for first slave 51 set in advance in control data CD, and drives relay 53 in accordance with contents of the copied data. In addition, first slave 51 writes information indicating that relay 53 is completely driven or detection information of sensor 55 at a data writing position for first slave 51 set in advance in control data CD, and transmits the information to head section 25. In this way, first slave 51 and second slave 61 replace and transmit control data CD at a high speed while performing the reading or writing processing on control data CD. A configuration of the industrial network illustrated in FIG. 3 is an example, and can be appropriately changed. For example, second slave 61 may be connected to master 43 via first slave 51. In addition, the number of slaves controlled by master 43 may be one, or may be three or more.

Next, a configuration of first slave 51 will be described. Second slave 61 of head section 25 has the same configuration as that of first slave 51. Therefore, in the following description, the configuration of first slave 51 will be described, and description of the configuration of second slave 61 will be omitted.

Figure 4:
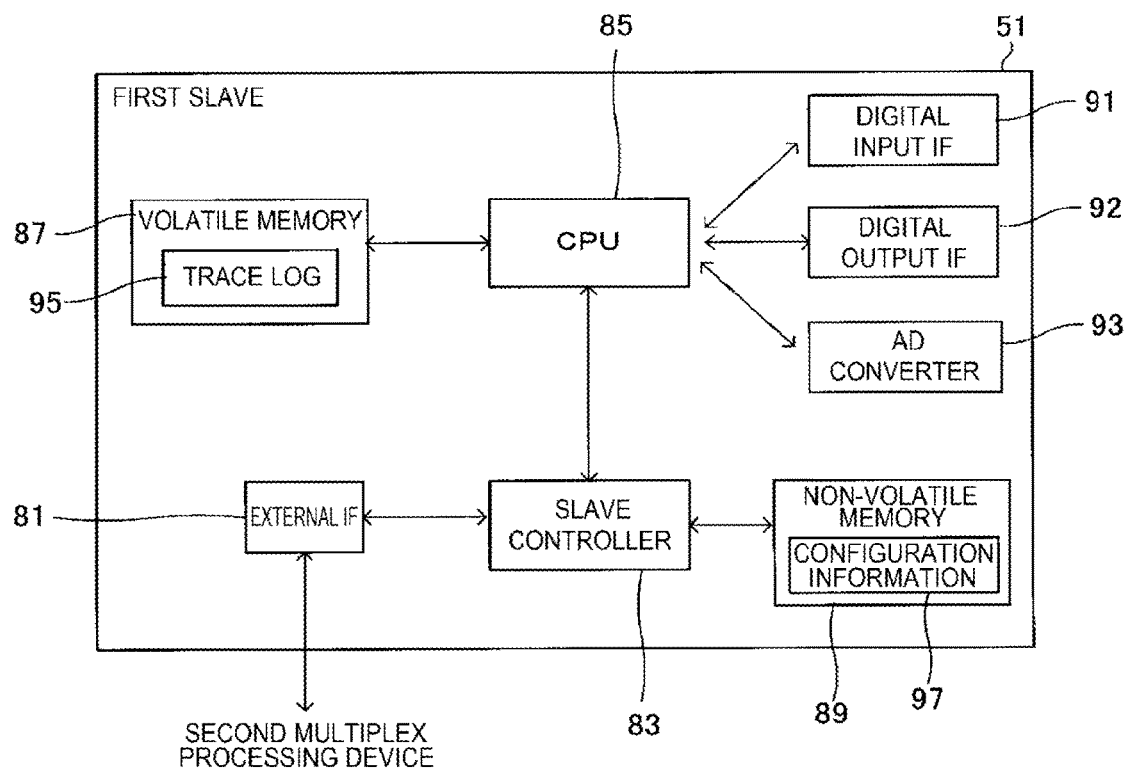
FIG. 4 is a block diagram of a first slave.

FIG. 4 illustrates a block diagram of first slave 51. As illustrated in FIG. 4, first slave 51 has external IF (abbreviation of interface) 81, slave controller 83, CPU 85, volatile memory 87, and non-volatile memory 89. For example, external IF 81 includes PHY that functions as an interface between a logical layer and a physical layer, and is connected to second multiplex processing device 57 via a LAN cable.

For example, slave controller 83 is an IP core used in constructing logic circuits such as a programmable logic device (PLD), a field programmable gate array (FPGA), and a complex programmable logic device (CPLD). Slave controller 83 is connected to external IF 81, and receives control data CD from master 43 via external IF 81. Slave controller 83 performs reading or writing processing on received control data CD. For example, slave controller 83 copies data from a data reading position for first slave 51 set in advance in control data CD, and outputs the copied data to CPU 85.

CPU 85 is connected to digital input IF 91, digital output IF 92, and AD converter 93. Digital input IF 91 is an interface for inputting a digital signal. Digital output IF 92 is an interface for outputting a digital signal. AD converter 93 is an interface for converting an analog signal and a digital signal. CPU 85 is connected to relay 53 and sensor 55 (refer to FIG. 3) via digital input IF 91. CPU 85 controls relay 53, based on control data CD input from slave controller 83. In addition, CPU 85 outputs an output signal of sensor 55 to slave controller 83. Slave controller 83 writes data input from CPU 85 at a data writing position for first slave 51 set in advance in control data CD, and transmits the data to second slave 61.

For example, volatile memory 87 is a SRAM, and is connected to CPU 85. Volatile memory 87 is used as a working memory for CPU 85. CPU 85 causes volatile memory 87 to store temporary data in processing control data CD. Non-volatile memory 89 is connected to slave controller 83. For example, non-volatile memory 89 is an EEPROM. Non-volatile memory 89 is not limited to the EEPROM, and may be a FLASH memory, a FRAM (registered trademark), or a MRAM.

Various programs are stored in non-volatile memory 89. CPU 85 executes a program read from non-volatile memory 89, and processes data relating to control data CD. In the following description, the control of CPU 85 may simply be described using a device name in some cases. For example, in some cases, the description "CPU 85 causes non-volatile memory 89 to store trace log 95" may mean that "CPU 85 executes a program of non-volatile memory 89 to store trace log 95 in non-volatile memory 89".

In addition, CPU 85 of the present embodiment causes volatile memory 87 to store trace log 95. Trace log 95 is an example of log information of the present disclosure, and is record data for specifying a cause of the communication abnormality, for example, in a case where the communication abnormality occurs such that communication with master 43 cannot be kept. Therefore, the data stored as trace log 95 of the present disclosure can adopt various data useful for specifying the cause of the communication abnormality. For example, CPU 85 associates information relating to control data CD with a time of performing the processing based on control data CD, and causes volatile memory 87 to store the associated data as trace log 95. In addition, configuration information 97 is stored in non-volatile memory 89. For example, configuration information 97 is setting information of first slave 51, and includes a unique value for individually identifying the slave and address information used for transmitting control data CD. The log information of the present disclosure is not limited to trace log 95 described above, and the concept also includes information such as a communication history which cannot directly specify the cause of the communication abnormality. Even if a user cannot specify the cause of the communication abnormality simply by viewing the contents of the log information, the user may specify the cause of the communication abnormality by analyzing the log information in detail or analyzing the log information in association with other information.

In addition, non-volatile memory 89 according to the present embodiment can restrict an access right for access to a storage area. For example, the access right to non-volatile memory 89 is granted only to master 43 as an initial setting. In this case, only master 43 having the access right can read data from non-volatile memory 89, and can write data in non-volatile memory 89. In this manner, it is possible to suppress competition for an access to non-volatile memory 89 or a change in configuration information 97. A method for controlling the access right is not particularly limited. For example, the access to non-volatile memory 89 may be controlled by slave controller 83. Alternatively, for example, a memory controller of non-volatile memory 89 may control the access to non-volatile memory 89.

Figure 5:
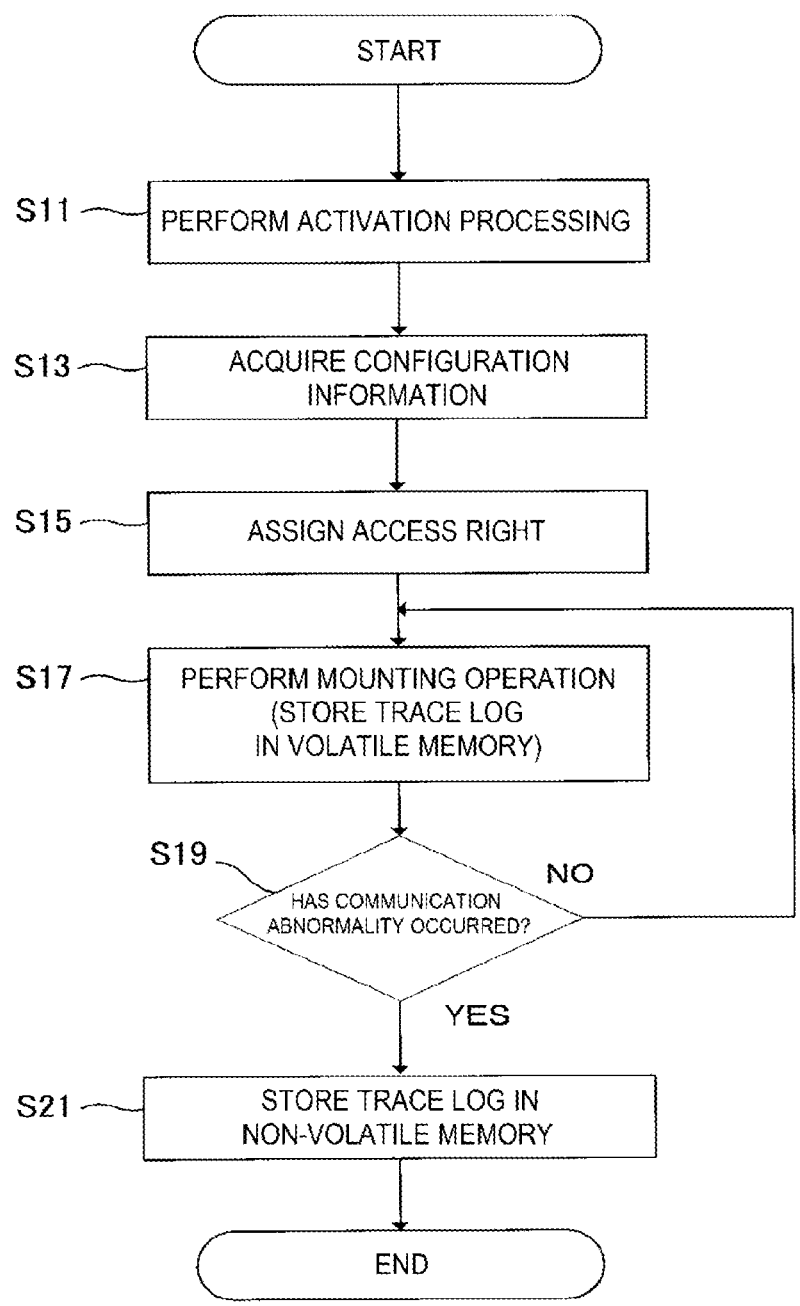
FIG. 5 is a flowchart for describing processing contents of the component mounter.

Next, processing in component mounter 20 having the above-described configuration will be described. FIG. 5 illustrates an example of processing in component mounter 20. First, in Step (hereinafter, simply referred to as "S") 11 of FIG. 5, component mounter 20 performs activation processing. For example, component mounter 20 activates the system when power is turned on in response to activation of component-mounting system 10. Main body control device 41 of component mounter 20 establishes a multiplex communication line illustrated in FIG. 3 when the system is activated.

Next, when detecting the establishment of the multiplex communication line, main body control device 41 causes master 43 to start the processing. Master 43 acquires configuration information 97 of each slave via the established multiplex communication line, and starts to construct the industrial network (S13). As described above, in first slave 51 and second slave 61 of the present embodiment, as an initial setting, only master 43 is allowed to have the access to non-volatile memory 89. For example, master 43 reads configuration information 97 from non-volatile memory 89 of first slave 51 by using the access right. For example, based on configuration information 97 read from first slave 51 and second slave 61, master 43 sets a transmission destination address of control data CD by detecting a type of the slave connected on the industrial network or a supporting communication protocol.

Next, master 43 assigns the access right to first slave 51 and second slave 61 (S15). CPU 85 of the present embodiment causes non-volatile memory 89 to store trace log 95 in response to occurrence of the communication abnormality. However, as described above, in an initial state, only master 43 has the access right to non-volatile memory 89. Therefore, when the communication abnormality occurs, CPU 85 of first slave 51 and second slave 61 cannot perform the writing processing in non-volatile memory 89. Therefore, the master 43 assigns the access right when completing the processing required for constructing the industrial network, such as acquisition of configuration information 97 (S15).

Accordingly, upon being activated, master 43 of the present embodiment acquires configuration information 97 from non-volatile memory 89 by using the access right to non-volatile memory 89 (S13). After acquiring configuration information 97, master 43 assigns the access right to each of first slave 51 and second slave 61 (S15). According to this configuration, first slave 51 can access to non-volatile memory 89 by using the access right, can cause non-volatile memory 89 to store trace log 95 in response to the occurrence of the communication abnormality. In addition, since configuration information 97 and trace log 95 are stored in the same storage section (non-volatile memory 89), the number of components required for manufacturing first slave 51 can be reduced, and the cost can be reduced. In the above description, the access right is assigned from master 43 to first slave 51 or second slave 61, but the present disclosure is not limited thereto. First slave 51 and second slave 61 may request and acquire the access right from master 43.

Next, component mounter 20 starts a mounting operation for mounting the electronic component on board 17 (S17). At a stage where the above-described processing (S11 to S15) is completed, component mounter 20 completes the establishment of the multiplex communication line or the construction of the industrial network. For example, when component mounter 20 completes the establishment of the multiplex communication line and is in a state where the mounting operation can start, component mounter 20 notifies management computer 15 of component-mounting system 10 that the preparation is completed. When management computer 15 receives the notification indicating that the preparation is completed from each component mounter 20 of production line 11, transmits control information required for the mounting operation to component mounter 20, and starts the mounting operation (S17). The control information here is information relating to a type of the board to be produced, information relating to a type of the electronic component, or information relating to a mounting position for mounting the electronic component.

In addition, when the construction of the industrial network is completed, CPU 85 of first slave 51 or second slave 61 of each component mounter 20 starts processing for storing trace log 95 in volatile memory 87 (S17). For example, as trace log 95, CPU 85 stores information of a command instructing to perform processing from master 43 to first slave 51 by using control data CD. More specifically, trace log 95 is information on a command that drives relays 53 and 63, information on an execution time of the command, and information on a target device that executes the command. In addition, for example, trace log 95 may be information on an execution result of the command instructed from master 43. Trace log 95 may be information indicating a detection content or a detection time of sensors 55 and 65.

Accordingly, CPU 85 of the present embodiment associates information relating to control data CD transmitted from master 43 with a time of performing the processing based on control data CD, and causes volatile memory 87 to store the associated data as trace log 95. According to this configuration, since trace log 95 is analyzed after the communication abnormality occurs, before the communication abnormality occurs or when the communication abnormality occurs, it is possible to specify which processing is performed on the slave side and when the processing is performed. Therefore, it is possible to more accurately specify the cause of the communication abnormality.

In addition, first slave 51 or second slave 61 of the present embodiment is connected to relays 53 and 63 or sensors 55 and 65, as a control target external device to be controlled based on control data CD. As the information relating to control data CD, CPU 85 causes volatile memories 87 to store information on control (content of commands) performed on relays 53 and 63, based on control data CD, and information (detection information) acquired from sensors 55 and 65, as trace log 95. According to this configuration, since the information on control performed on the external device such as relays 53 and 63 and the information acquired from the external device such as sensors 55 and 65 are analyzed, before the communication abnormality occurs and when the communication abnormality occurs, it is possible to specify which operation is operated by the control target external device.

In addition, trace log 95 may be information on a device that is not connected to the industrial network. CPU 85 may store a command to an encoder of a linear motor mounted on X-axis slide mechanism 27A and position information output from the encoder, as trace log 95. Alternatively, CPU 85 may store, as trace log 95, a receive time of a trigger signal, an imaging time, or a lighting time of the cameras, those being recorded for mark camera 66 or part camera 67.

In addition, CPU 85 of the present embodiment causes volatile memory 87 to store information indicating a connection state of the multiplex communication line, as trace log 95. For example, CPU 85 of first slave 51 periodically monitors a connection state of GbE-PHY 59, and monitors the connection state of the multiplex communication line of LAN cable 71. Alternatively, in a case where second multiplex processing device 57 monitors the connection state of GbE-PHY 59, CPU 85 may acquire information monitored by other devices, and may store the acquired information as trace log 95. According to this configuration, since the information on the connection state of the multiplex communication line is stored as trace log 95, it is possible to specify whether or not the cause of the communication abnormality is disconnection of the multiplex communication line. That is, it is possible to distinguish whether the cause of the communication abnormality depends on the multiplex communication side or depends on the slave side.

Next, when CPU 85 starts to store trace log 95, CPU 85 determines whether the communication abnormality has occurred (S19). CPU 85 repeatedly performs processing of S17 until CPU 85 determines that the communication abnormality has occurred (S19: NO). Component mounter 20 continues the mounting operation. In addition, CPU 85 continues processing for storing trace log 95.

In addition, as described above, CPU 85 monitors a connection state of the multiplex communication line. When detecting the disconnection of the multiplex communication line, CPU 85 determines that the communication abnormality has occurred (S19: YES). Therefore, CPU 85 of the present embodiment determines that the communication abnormality has occurred in response to the disconnection of the multiplex communication line (S19: YES). In the work machine in a FA field such as component mounter 20, a device having attached master 43 (such as device main body section 21) and a device having attached first slave 51 (such as X-axis slide mechanism 27A) are connected to each other by using various cables. In this case, multiplex communication is used, thereby enabling reduced wiring. In this configuration, as will be described later, since trace log 95 is retreated to non-volatile memory 89 in response to the disconnection of the multiplex communication line (S21), it is possible to specify the cause of the disconnected multiplex communication line.

In addition, CPU 85 monitors the connection state of the industrial network in addition to the connection state of the multiplex communication line. For example, when a state where CPU 85 cannot receive control data CD from masters 43 is continued for a prescribed period of time, CPU 85 determines that the industrial network is disconnected, and determines that the communication abnormality has occurred (S19: Yes). Therefore, when LAN cable 71 or LAN cable 72 is disconnected, CPU 85 of the present embodiment determines that the communication abnormality has occurred.

Here, in a case where any abnormality occurs in component mounter 20, if master 43 and first slave 51 can normally communicate with each other, master 43 can acquire trace log 95 stored in volatile memory 87. However, in a case where LAN cable 71 is disconnected, master 43 cannot acquire trace log 95 from first slave 51 via the multiplex communication line. In this case, when a user of component mounter 20 performs an operation for stopping the power supply of X-axis slide mechanism 27A or head section 25, trace log 95 stored in volatile memory 87 disappears, and the cause of the abnormality cannot be specified. Therefore, when CPU 85 of the present embodiment detects the disconnection of the multiplex communication line in S19 (S19: Yes), CPU 85 causes non-volatile memory 89 to store trace log 95 stored in volatile memory 87 until then (S21).

CPU 85 may copy trace log 95 from volatile memory 87 to non-volatile memory 89, or may move trace log 95 from volatile memory 87 to non-volatile memory 89. In S15 described above, the access right is assigned from master 43 to first slave 51 and second slave 61. CPU 85 performs processing for storing trace log 95 in non-volatile memory 89 by using the access right assigned from master 43.

For example, when detecting the communication abnormality, component mounter 20 issues an alarm, and notifies a user that the communication abnormality has occurred in X-axis slide mechanism 27A and head section 25. When the alarm of component mounter 20 is issued and component mounter 20 stops the operation, for example, the user performs a replacement operation of head section 25. As described above, head section 25 of the present embodiment is attachable to and detachable from X-axis slide mechanism 27A. For example, the user replaces head section 25 with spare head section 25 to resume the operation of component mounter 20 as soon as possible. Alternatively, for example, the user stops the power supply of component mounter 20, and checks a state inside the device. There is a possibility that trace log 95 stored in volatile memory 87 may be lost due to the replacement of head section 25 or the stopped power supply of component mounter 20.

In contrast, CPU 85 of the present embodiment causes non-volatile memory 89 to store trace log 95 in association with the communication abnormality. In this manner, trace log 95 is continuously stored in non-volatile memory 89 even if the power supply of component mounter 20 is stopped or head section 25 is replaced.

For example, the user connects head section 25 used when the communication abnormality has occurred to a dedicated jig, and reads trace log 95. In this manner, while production efficiency is improved by replacing head section 25 and causing component mounter 20 to continue the mounting operation, it is possible to analyze the cause of the abnormality by reading trace log 95 from replaced head section 25.

Alternatively, the user may directly connect a notebook PC to first slave 51 and may read configuration information 97 from non-volatile memory 89. In this manner, the power of component mounter 20 is stopped, and configuration information 97 can be acquired in a state where the device is completely stopped. Since the user analyzes acquired trace log 95, for example, the user can check whether the device is normally operated until any command is executed, and can check whether the communication abnormality has occurred when any command is executed. In addition, in component mounter 20, in a case where head moving mechanism 27 or head section 25 is operated at a specific speed or position, noise is generated, thereby causing a possibility that the communication abnormality may occur due to the generated noise. In this case, since the content of trace log 95 is checked, it is possible to analyze conditions of the noise generation (moving speed, moving position, or combination of instructed commands). There is a possibility that this noise may not be found unless component mounter 20 is operated under various conditions. Therefore, component mounter 20 is actually installed and operated to check trace log 95 when the communication abnormality has occurred, it is possible to find a specific operation that causes the communication abnormality.

In addition, the communication abnormality in the present disclosure is not limited to the disconnection of LAN cable 71. For example, CPU 85 may monitor a state of external IF 81, and may determine that a communication abnormality has occurred, when external IF 81 fails and the state of external IF 81 cannot be acquired for a prescribed period of time is continued. In addition, for example, when CPU 85 detects the communication abnormality such that communication with master 43 cannot be kept, CPU 85 may detect own processing abnormality. When an error occurs in the processing of CPU 85, master 43 has a possibility that communication with first slave 51 may not be available. Therefore, for example, if CPU 85 detects an error in program execution processing, CPU 85 may determine that the communication abnormality is detected (S19: YES), and may cause the non-volatile memory 89 to store trace log 95 (S21). A method for detecting processing abnormality in CPU 85 is not particularly limited. For example, the processing abnormality may be detected using a watchdog timer that monitors the processing of CPU 85.

Incidentally, component mounter 20 is an example of the work machine. Head section 25 is an example of the movable section. First slave 51 and second slave 61 are examples of the slave. Relays 53 and 63 and sensors 55 and 65 are examples of the external device. External IF 81 is an example of the communication interface. CPU 85 is an example of the control section. Volatile memory 87 is an example of the volatile storage section. Non-volatile memory 89 is an example of the non-volatile storage section. Trace log 95 is an example of the log information. S13 is an example of the acquisition processing. S15 is an example of the assignment processing. S17 is an example of the first storage processing and the first storage step. S19 is an example of the communication abnormality determination processing and the communication abnormality determination step. S21 is an example of the second storage processing and the second storage step.

As described above, according to the present embodiment described above, the following advantageous effects can be achieved. According to one aspect of the present embodiment, while CPU 85 causes volatile memory 87 to store trace log 95 for specifying the cause of the communication abnormality in a case where the communication abnormality occurs such that communication with master 43 cannot be kept (S17), CPU 85 determines whether the communication abnormality has occurred (S19). When CPU 85 determines that the communication abnormality has occurred (S19: YES), CPU 85 acquires trace log 95 from volatile memory 87, and causes non-volatile memory 89 to store trace log 95 in (S21).

According to this configuration, CPU 85 causes volatile memory 87 to store trace log 95 during a normal operation. Then, CPU 85 causes non-volatile memory 89 to store trace log 95 stored in volatile memory 87 in response to the occurrence of the communication abnormality. In this manner, even when the power of component mounter 20 is stopped or head section 25 is replaced, trace log 95 can be continuously stored in non-volatile memory 89. Therefore, even in a case where trace log 95 cannot be acquired via the multiplex communication line from first slave 51 to master 43 due to the communication abnormality, trace log 95 can be retrieved from non-volatile memory 89 of first slave 51. Then, since trace log 95 is analyzed, it is possible to specify the cause of the communication abnormality.

The present disclosure is not limited to the above-described embodiments, and as a matter of course, various improvements and modifications can be made within the scope not departing from the gist of the present application. For example, CPU 85 may not store the information relating to control data CD, as trace log 95. CPU 85 may not monitor the multiplex communication lines. In addition, head section 25 may not be attachable and detachable. In addition, non-volatile memory 89 may be a memory element which does not require the access right. In addition, trace log 95 may be stored in a storage section different from the storage section which stores configuration information 97.

In addition, the processing for storing trace log 95 may be performed by a device other than CPU 85, for example, slave controller 83. In addition, the multiplex communication line is not limited to the Gigabit Ethernet (registered trademark), and may be optical communication using an optical fiber cable, for example. In addition, without being limited to wired communication, the multiplex communication line may adopt wireless communication. In addition, component mounter 20 may not include the multiplex communication system. In this case, without interposing the multiplex communication line, master 43 may transmit and receive control data CD to and from first slave 51.

In addition, in the above-described embodiment, as the work machine according to the present disclosure, an example of adopting component mounter 20 for mounting the electronic component on board 17 has been described. However, the work machine according to the present disclosure is not limited to component mounter 20, and can adopt other work machines such as a solder printing device for applying solder to board 17. In addition, for example, the work machine may be a machine tool or a robot that carries out assembly work.

REFERENCE SIGNS LIST

20: component mounter (work machine), 21: device main body section, 25: head section (movable section), 43: master, 51: first slave (slave), 53, 63: relay (external device), 55, 65: sensor (external device), 61: second slave (slave), 85: CPU (control section), 87: volatile memory (volatile storage section), 89: non-volatile memory (non-volatile storage section), 95: trace log (log information), 97: configuration information, CD: control data

The invention claimed is:
1. A method for storing log information in a component mounter including a device main body including a master configured to transmit control data; and
a mounting head detachably attached to the device main body and configured to pick up and mount the components and to move relatively to the device main body, the mounting head including a slave including a communication interface connected to the master in an industrial network, a processor configured to perform processing based on control data transmitted from the master via the communication interface, a volatile storage section connected to the processor, and a non-volatile storage section connected to the processor, the method comprising:
network establishment step where the master and slave establish communication via the industrial network, the processor receiving an access right to the non-volatile storage section from the master upon completion of the network establishment step;
a first storage step of causing the volatile storage section to store the log information, the log information including information relating to the control data transmitted from the master, and a time of performing the processing based on the control data;
a communication abnormality determination step of determining whether a communication abnormality between the slave and the master has occurred; and
a second storage step of causing the non-volatile storage section via the access right to store the log information by acquiring the log information from the volatile storage section, in response to a determination made in that the communication abnormality has occurred as a result of the communication abnormality determination step.
2. A component mounter to mount components on a board, comprising:
a device main body including a master configured to transmit control data; and a mounting head detachably attached to the device main body and configured to pick up and mount the components and to move relatively to the device main body, the mounting head including a slave, the slave comprising:
- a communication interface connected to the master in an industrial network;
- a processor configured to perform processing based on the control data transmitted from the master via the communication interface;
- a volatile storage section connected to the processor; and
- a non-volatile storage section connected to the processor, wherein the processor performs
- network establishment processing where the master and slave establish communication via the industrial network, the processor receiving an access right to the non-volatile storage section from the master upon completion of the network establishment processing,
- first storage processing storing log information into the volatile storage section, the log information including information relating to the control data transmitted from the master, and a time of performing the processing based on the control data,
- communication abnormality determination processing for determining whether a communication abnormality between the slave and the master has occurred, and
- second storage processing storing the log information into the non-volatile storage section via the access right by acquiring the log information from the volatile storage section, in response to a determination made in that the communication abnormality has occurred as a result of the communication abnormality determination processing.

3. The component mounter according to claim 2, wherein the log information is a trace log for specifying a cause of the communication abnormality.

4. The component mounter according to claim 2, wherein the slave is connected to a control target external device for which control based on the control data is performed, and
wherein as the information relating to the control data, the processor causes the volatile storage section to store control information, control of which being performed for the control target external device based on the control data, and information acquired from the control target external device, as the log information.

5. The component mounter according to claim 2, wherein the communication interface is connected to the master via a multiplex communication line, and
wherein in the communication abnormality determination processing, the processor determines that the communication abnormality has occurred in response to occurrence of disconnection of the multiplex communication line.

6. The component mounter according to claim 5, wherein in the first storage processing, the processor causes the volatile storage section to store information indicating a connection state of the multiplex communication line, as the log information.

7. The component mounter according to claim 2, wherein configuration information relating to the slave is stored in the non-volatile storage section, and
wherein the master performs
- acquisition processing for acquiring the configuration information from the non-volatile storage section by using an access right to the non-volatile storage section upon activation, and
- assignment processing for assigning the access right to the slave after acquiring the configuration information during the network establishment processing.

8. The component mounter according to claim 2, further comprising:
a head moving mechanism including an X-axis slider that move the mounting head in an X-direction,
wherein the X-axis slider includes a relay that drives a brake of the X-axis slider, and
wherein the slave processes signals input to and output from the relay.

9. The component mounter according to claim 8, wherein the log information includes information of an execution result of the relay.

10. The component mounter according to claim 2, wherein the network establishment processing where the master and slave establish communication via the industrial network is performed when the mounting head is attached to the device main body.

* * * * *